United States Patent
Kang

(10) Patent No.: US 10,209,514 B2
(45) Date of Patent: Feb. 19, 2019

(54) APPARATUS AND METHOD FOR PROVIDING INFORMATION ASSOCIATED WITH OBJECT

(71) Applicant: Samsung Electronics Co., Ltd., Suwon-si, Gyeonggi-do (KR)

(72) Inventor: Woo-sung Kang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 14/744,603

(22) Filed: Jun. 19, 2015

(65) Prior Publication Data

US 2015/0370070 A1    Dec. 24, 2015

(30) Foreign Application Priority Data

Jun. 20, 2014    (KR) ........................ 10-2014-0075889

(51) Int. Cl.
*G02B 27/01*    (2006.01)

(52) U.S. Cl.
CPC ...... *G02B 27/017* (2013.01); *G02B 2027/014* (2013.01); *G02B 2027/0138* (2013.01); *G02B 2027/0178* (2013.01)

(58) Field of Classification Search
CPC .......... G02B 27/017; G02B 2027/0138; G02B 2027/014; G02B 2027/0178
See application file for complete search history.

(56) References Cited

U.S. PATENT DOCUMENTS

| | | | | |
|---|---|---|---|---|
| 6,084,556 A | * | 7/2000 | Zwern | G09B 21/008 345/158 |
| 2010/0150456 A1 | * | 6/2010 | Tanaka | G08B 13/19602 382/219 |
| 2011/0096995 A1 | * | 4/2011 | Ito | G06F 17/30256 382/190 |
| 2012/0154557 A1 | * | 6/2012 | Perez | H04N 21/25891 348/53 |
| 2012/0242481 A1 | * | 9/2012 | Gernandt | G06K 19/0705 340/539.13 |
| 2013/0069985 A1 | | 3/2013 | Wong et al. | |
| 2014/0002643 A1 | * | 1/2014 | Aziz | H04M 1/72522 348/143 |
| 2014/0077944 A1 | * | 3/2014 | Baskin | H04Q 9/00 340/539.1 |
| 2014/0089243 A1 | * | 3/2014 | Oppenheimer | G06F 21/50 706/46 |
| 2014/0225740 A1 | * | 8/2014 | Hochman | G08B 13/1427 340/686.6 |
| 2014/0240088 A1 | * | 8/2014 | Robinette | G08B 13/1427 340/5.61 |
| 2014/0368688 A1 | * | 12/2014 | John Archibald | H04N 5/23241 348/222.1 |
| 2015/0326570 A1 | * | 11/2015 | Publicover | G06F 21/64 726/4 |
| 2016/0026253 A1 | * | 1/2016 | Bradski | G02B 27/225 345/8 |

* cited by examiner

Primary Examiner — Jose Soto Lopez
(74) Attorney, Agent, or Firm — Jefferson IP Law, LLP

(57) ABSTRACT

A method of operating a device is provided. The method includes acquiring an image, determining whether an object registered in a device exists in the image, and if it is determined that the registered object exists in the image, displaying associated information of the registered object.

23 Claims, 9 Drawing Sheets

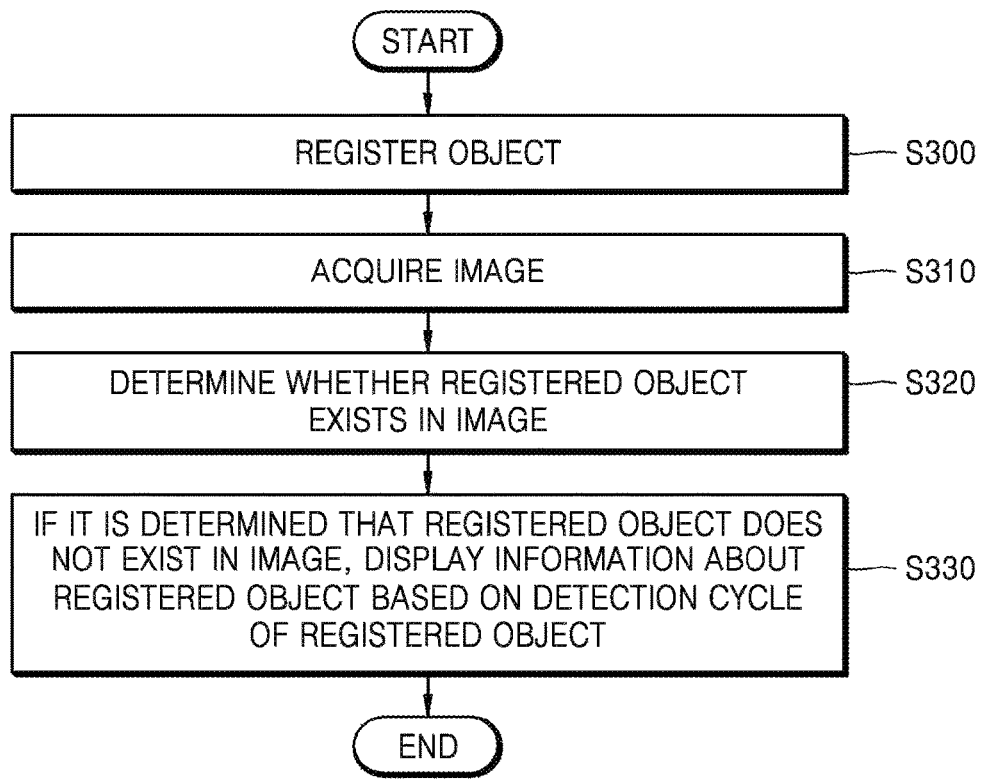
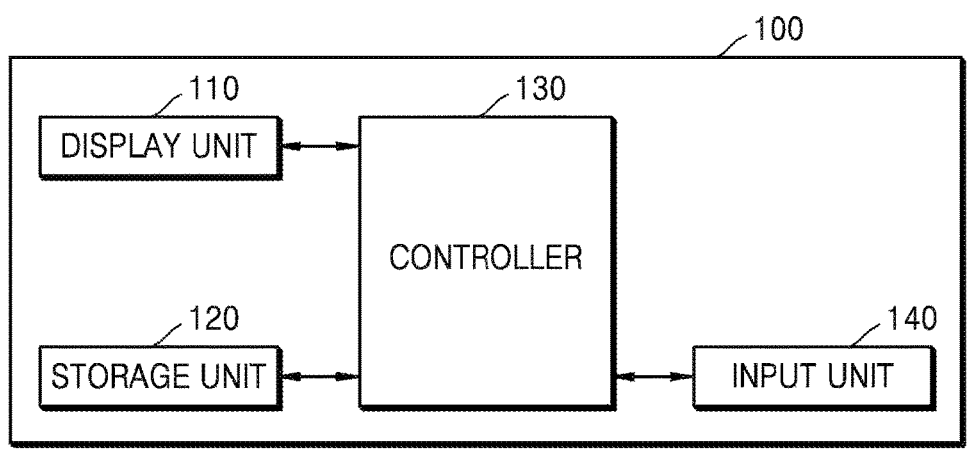

FIG. 6
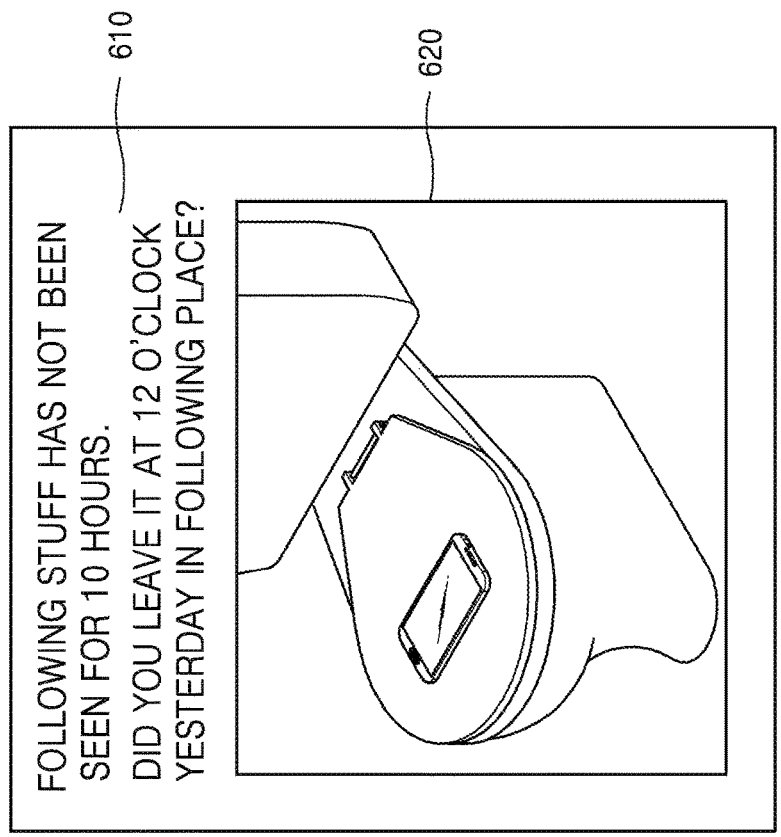
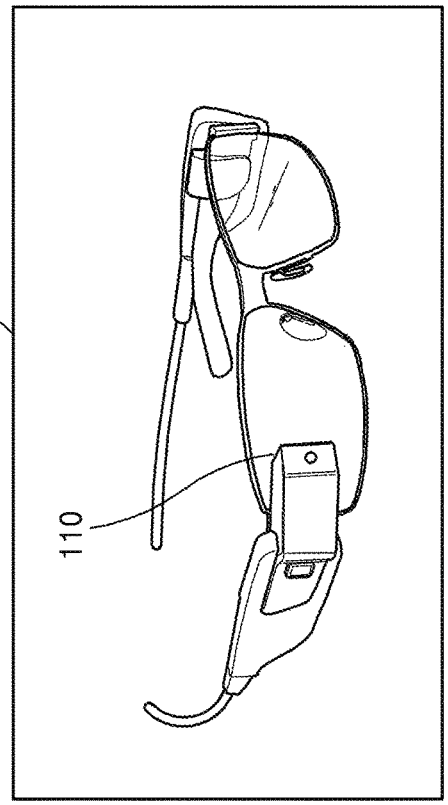

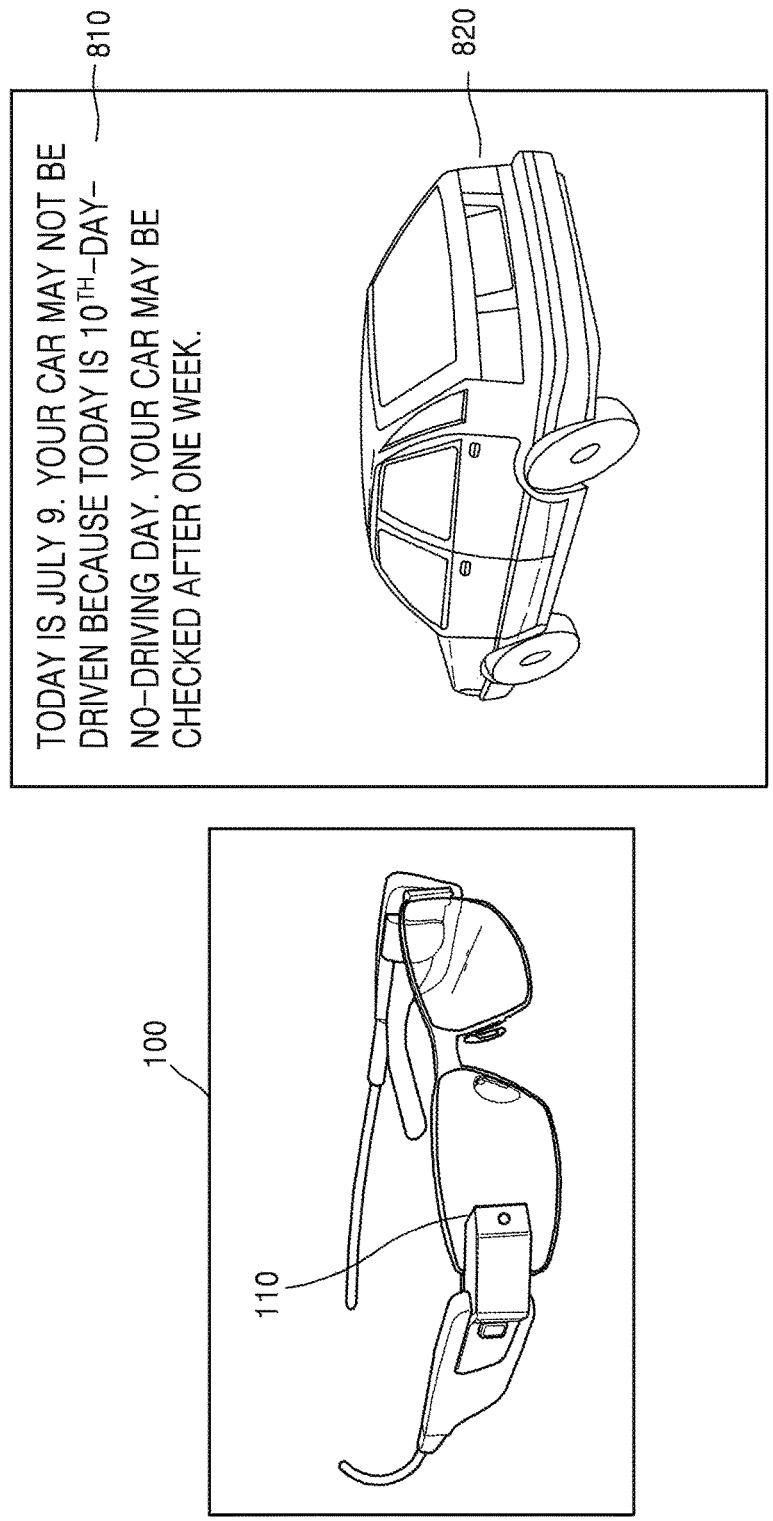

APPARATUS AND METHOD FOR PROVIDING INFORMATION ASSOCIATED WITH OBJECT

CROSS-REFERENCE TO RELATED APPLICATION(S)

This application claims the benefit under 35 U.S.C. § 119(a) of a Korean patent application filed on Jun. 20, 2014 in the Korean Intellectual Property Office and assigned Serial number 10-2014-0075889, the entire disclosure of which is hereby incorporated by reference.

TECHNICAL FIELD

The present disclosure relates to a method and an apparatus for providing information associated with a registered object existing in an acquired image.

BACKGROUND

Technology for smart glasses has been developed in various fields. Smart glasses have been studied to replace or supplement smart phones for calling or checking messages through voice commands. Also, smart glasses have been studied as apparatuses that operate as remote controllers for recognizing and controlling controllable home appliances.

As research into smart glasses continues, technology for providing information appropriate for user conditions has been studied with respect to smart glasses.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for providing information associated with a registered object or information about the registered object based on whether the registered object exists in an acquired image.

Additional aspects will be set forth in part in the description which follows and, in part, will be apparent from the description, or may be learned by practice of the presented embodiments.

In accordance with an aspect of the present disclosure, a method of operating a device is provided. The method includes registering an object detected from an image acquired by the device in the device based on a preset criterion, acquiring an image, determining whether the object registered in the device exists in the image, and if it is determined that the registered object exists in the image, displaying associated information of the registered object.

The object may be registered based on at least one selected from a detection frequency indicating a number of times the object appears in the image acquired by the device and an interaction frequency indicating a number of times the object contacts a user of the device in the acquired image.

The method may further include if it is determined that the registered object does not exist in the acquired image, displaying information about the registered object based on a detection cycle of the registered object.

The information about the registered object may include a most recent image from which the registered object is detected.

The associated information may include information about at least one object associated with the registered object.

The information about the at least one object may include a most recent image from which the at least one object is detected.

The associated information may include information that is input for the registered object by a user.

The registered object may indicate a place, and the associated information may include information about at least one object associated with the registered object.

The displaying of the associated information may include displaying information about at least one object associated with the registered object with reference to a time interval between a detection time of the registered object and a detection time of the at least one object associated with the registered object.

The associated information may include a most recent image from which at least one object associated with the registered object is detected.

The registered object may indicate a place, and the associated information may include information that is input for the registered object by a user.

In accordance with another aspect of the present disclosure, a device is provided. The device includes an input unit configured to acquire an image, a controller configured to register an object detected from the acquired image in the device based on a preset criterion, to determine whether the object registered in the device exists in the image, and, if it is determined that the registered object exists in the image, to control to display associated information of the registered object, and a display unit configured to display the associated information.

The object may be registered based on at least one selected from a detection frequency indicating a number of times the object appears in the image acquired by the device and an interaction frequency indicating a number of times the object contacts a user of the device in the acquired image.

If it is determined that the registered object does not exist, the controller may be further configured to control to display information about the registered object based on a detection cycle of the registered object, and the display unit may be further configured to display the information about the registered object.

The information about the registered object may include a most recent image from which the registered object is detected.

The associated information may include information about at least one object associated with the registered object.

The information about the at least one object may include a most recent image from which the at least one object is detected.

The associated information may include information that is input for the registered object by a user.

The registered object may indicate a place, and the associated information may include information about at least one object associated with the registered object.

The controller may be further configured to display information about at least one object associated with the registered object, with reference to a time interval between a detection time of the registered object and a detection time of at least one object associated with the registered object.

The associated information may include a most recent image from which at least one object associated with the registered object is detected.

The registered object may indicate a place, and the associated information may include information about the registered object based on an input of a user.

In accordance with another aspect of the present disclosure, a non-transitory computer-readable recording medium records thereon a program for executing the method in a computer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flowchart of a method of displaying information about a registered object through a device if it is determined that the registered object does not exist, according to an embodiment of the present disclosure;

FIG. 4 is a block diagram of a device according to an embodiment of the present disclosure;

FIG. 6 illustrates a process of reminding a user about a registered object based on a detection frequency of the registered object through a device according to an embodiment of the present disclosure;

FIG. 8 illustrates a process of displaying information based on an input of a user if a device detects a registered object, according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that when a part is referred to as being "connected to" or "coupled to" another part, it may be directly or electrically connected or coupled to the other part or intervening elements may be present. Also, it will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Various embodiments will now be described in detail with reference to the attached drawings.

Figure 1:
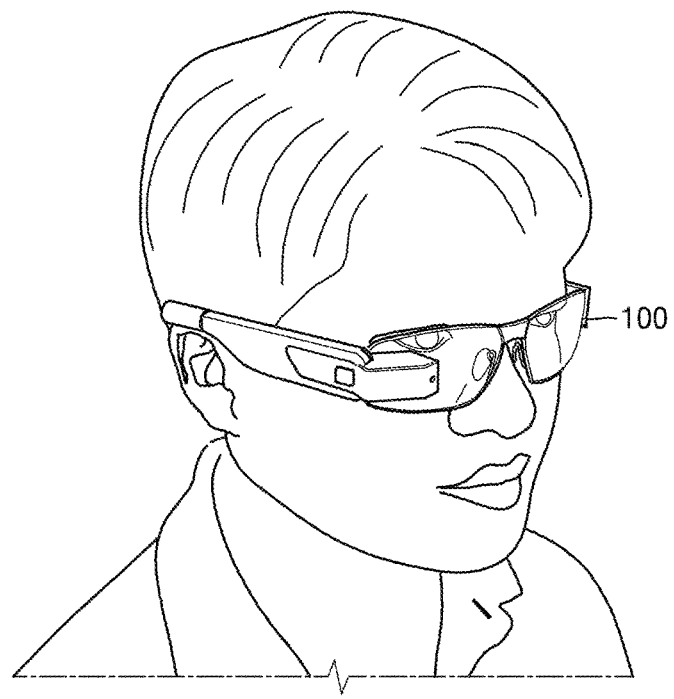
FIG. 1 illustrates a method of displaying information associated with a registered object through a device according to an embodiment of the present disclosure.

FIG. 1 illustrates a method of displaying information associated with a registered object through a device 100 according to an embodiment of the present disclosure.

A user of the device 100 illustrated in FIG. 1 may wear the device 100. The device 100 may acquire a scene around the user or a scene the user is viewing, as an image.

According to an embodiment, the device 100 may detect an object from an acquired image. The device 100 may register an object, which appears many times in the acquired image, in the device 100. The device 100 may also store an image in which a registered object exists.

According to an embodiment, the device 100 may display information associated with a registered object if the registered object exists in an acquired image. For example, the device 100 may display information about an object associated with a registered object, which is frequently detected at a similar time to a time when the registered object is detected or information about a registered object indicating a place. The device 100 may also display information about the registered object if it is determined that the registered object does not exist in the acquired image.

Figure 2:
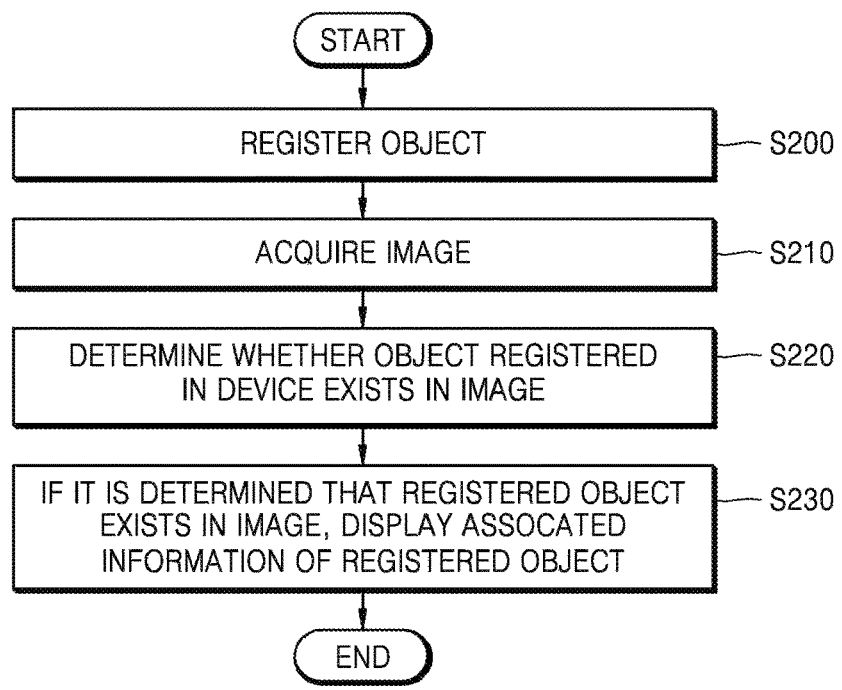
FIG. 2 is a flowchart of a method of displaying information associated with a registered object through a device according to whether the registered object is detected, according to an embodiment of the present disclosure.

FIG. 2 is a flowchart of a method of displaying information associated with a registered object through the device 100 according to whether the registered object is detected, according to an embodiment of the present disclosure.

In operation S200, the device 100 may register an object.

According to an embodiment, the device 100 may detect an object from an acquired image. The device 100 may measure a detection frequency of the object. The detection frequency is defined as the number of times an object appears in acquired images. For example, the device 100 may acquire images at preset time intervals and count the number of images having objects from the acquired images to measure a detection frequency.

According to an embodiment, the device 100 may measure an interaction frequency of an object. The interaction frequency is defined as the number of times an object contacting the user of the device 100 appears in acquired images over a preset time period. For example, the device 100 may acquire images at preset time intervals and count the number of times a detected object contacts a body of the user to measure an interaction frequency.

According to an embodiment, the device 100 may measure a detection cycle of an object. The detection cycle is defined as an average time until an object detected from an acquired image is re-detected. For example, the device 100 may count the number of times a wallet is detected from images over a preset time period and acquire a detection cycle of the wallet based on the counted number of times and the preset time period.

According to an embodiment, the device 100 may set a threshold value for registering an object in the device 100. The threshold value is defined as a preset value for registering an object detected from an image acquired by the device 100 in the device 100. For example, the device 100 may use the threshold value as a criterion for determining whether the object is registered.

According to an embodiment, the device 100 may compare the threshold value with the detection frequency of the object and then register the object in the device 100. For example, the device 100 may set the threshold value to 10 times. If the threshold value is set to 10 times, the device 100 may count the number of times the wallet is detected over a preset time period. Therefore, if the number of times the object is detected is 10 times or exceeds 10 times, the device 100 may register the object in the device 100.

The device 100 may also compare the interaction frequency of the object with the threshold value and then register the object in the device 100. For example, if the threshold value is set to 10 times, the device 100 may count the number of times the wallet contacts the user of the device 100 over a preset time period. If the number of times the wallet contacts the user of the device 100 is 10 times or exceeds 10 times, the wallet may be registered in the device 100.

Also, the device 100 may compare the interaction frequency and the detection frequency of the object with the threshold value to register the object in the device 100. For example, if the threshold value is set to 10 times, and a sum of the number of detections of the wallet counted over a preset time period, the wallet counted for a preset time, and the number of times the user of the device 100 contacts the wallet is 10 or more times or exceeds 10 times, the device 100 may register the object in the device 100.

The device 100 may also compare the detection cycle of the object with the threshold value to register the object in the device 100. For example, if the threshold value is set to 4 hours, and an average detection cycle of the wallet, which is calculated based on the number of the detections of the wallet counted over the preset time period and the preset time period, is within 4 hours, the device 100 may register the wallet in the device 100.

According to an embodiment, the device 100 may determine a preset time period and a threshold value based on an input of the user. For example, the device 100 may register the object, which is detected 5 or more times over a period of 5 hours, in the device 100 based on the input of the user.

According to an embodiment, the device 100 may allocate an identifier (ID) to the object when registering the object. The device 100 may also store at least one selected from characteristic information and representative image information of the object in a form of a mapping table. For example, the device 100 may allocate an ID to the wallet when registering the wallet and store the allocated ID, characteristic information, and representative image information of the wallet in a form of a mapping table.

In operation S210, the device 100 may acquire an image.

According to an embodiment, the device 100 may acquire a scene around the user of the device 100 as an image. For example, the device 100 may acquire a scene existing in front of the user of the device 100 as an image. The image acquired by the device 100 may include a picture or a moving picture.

The device 100 may also acquire an image with reference to a position and a viewing angle of the user. For example, the device 100 may acquire a scene around the position of the user of the device 10 as an image by using an input unit. The device 100 may also acquire a scene the user of the device 100 looks at, as an image with reference to the user's position and the viewing angle.

According to an embodiment, the device 100 may store an acquired image. For example, the device 100 may store the acquired image in a picture form and a moving picture form.

In operation S220, the device 100 may determine whether the object registered in the device 100 exists in the image.

According to an embodiment, the device 100 may detect an object existing in an acquired image. The object may include a home appliance such as a television (TV), an air conditioner, a microwave oven, or the like, or belongings such as a smartphone, a wallet, a key, or the like, but is not limited thereto. The object may also include an object indicating a place. For example, the object may include an office door indicating an entrance to an office, a front door indicating an entrance to a home, or the like, but is not limited thereto. Also, the object may include a formless object such as letters, numbers, a drawing, or the like. For example, the object may include a license plate number that is written on a license plate of a car.

According to an embodiment, the device 100 may detect an object from an image by using various types of algorithms. For example, the device 100 may detect the object from the image by using an edge detection method but is not limited thereto.

According to an embodiment, the device 100 may determine whether a registered object exists in an image. The device 100 may compare characteristic information of an object detected from an acquired image with characteristic information of the registered object to determine whether the registered object exists in the image. For example, the device 100 may compare effective edge information of the object detected from the acquired image with effective edge information of a registered wallet stored in the device 100 to determine whether the object detected from the acquired image is the registered wallet.

If it is determined in operation S220 that the registered object exists in the image, the device 100 may display information associated with the registered object in operation S230.

According to an embodiment, the device 100 may store information associated with a registered object. The device 100 may include information about at least one object associated with the registered object as associated information. An object associated with the registered object may include an object that is frequently detected at a similar time to a time when the registered object is detected. In detail, if a TV is registered in the device 100, the device 100 may store information about at least one selected from a remote controller frequently detected at a similar time to a time when the TV is detected, a speaker operating along with the TV, and a smartphone operating along with the TV, as associated information of the registered TV. In this case, information stored in the device 100 may include a most recent image. For example, the device 100 may include an image that was most recently acquired from images determined as including the remote controller, the speaker operating with the TV, and the smartphone operating along with the TV.

Also, if a registered object indicates a place, the device 100 may store information about an object associated with the registered object indicating the place, as associated information. The object associated with the registered object indicating the place may include an object that is frequently detected over a preset time period before or after the registered object indicating the place is detected. For example, if a front door indicating an entrance to a home is registered, the device 100 may store information about an object such as a wallet, a smartphone, or the like, which is frequently detected over a preset time period before the registered front door is detected, as associated information about the registered front door.

Also, the device 100 may store information based on an input of the user as associated information. For example, if the user of the device 100 inputs a regular checkup date of a car registered in the device 100 into the device 100, the device 100 may store information about the regular checkup date of the car as associated information of the registered car.

According to an embodiment, if it is determined that a registered object exists in an image acquired by the device 100, the device 100 may display stored associated information of the registered object. For example, the device 100 may display information about an object that is frequently detected at a similar time to a time when the registered object is detected. In detail, if it is determined that a TV registered in the device 100 exists in an acquired image, the device 100 may display information about at least one selected from a remote controller, a speaker operating along with the TV, and a smartphone operating along with the TV but is not limited thereto.

Also, if it is determined that a registered object exists in an acquired image, the device 100 may also display information based on an input of the user. In detail, if it is determined that a car registered in the device 100 exists in an acquired image, the device 100 may display information about a regular checkup date of the car input by the user but is not limited thereto.

Also, if it is determined that a registered object indicating a place exists in an acquired image, the device 100 may display information about an object associated with the registered object indicating the place. For example, if the device 100 detects a registered front door indicating an entrance to a home, the device 100 may display information about an object such as a wallet, a smartphone, or the like, which is frequently detected over a preset time period before the registered front door is detected, as associated information about the registered front door.

When displaying information about an object associated with a registered object indicating a place, the device 100 may refer to a time interval between a detection time of the object associated with the registered object and a detection time of the registered object. For example, if the device 100 detects a registered front door, the device 100 may display information about a portable phone if a time interval between a detection time of the registered front door and a detection time of the portable phone associated with the registered front door, with reference to the time interval. In this case, a preset value may include an average time interval between the registered front door and the portable phone.

Also, if it is determined that a registered object indicating a place exists in an acquired image, the device 100 may display information based on an input of the user. For example, if the device 100 detects a registered office door indicating an entrance to an office, the device 100 may display a schedule previously input by the user as associated information about the registered office door.

According to an embodiment, the device 100 may display associated information by using at least one selected from a voice, a message, and an image. For example, if the device 100 detects a registered front door indicating an entrance to a home, the device 100 may display information about an object such as a wallet, a portable phone, or the like, which is frequently detected over a preset time period before the registered front door is detected, by using a voice. The device 100 may also display the information about the object, such as the wallet, the portable phone, or the like, by using a message. Also, the device 100 may display the information about the object, such as the wallet, the portable phone, or the like, by using an image. The device 100 may use a picture or a moving picture and use a most recent image of a stored object.

FIG. 3 is a flowchart of a method of displaying information about a registered object through the device 100 if it is determined that the registered object does not exist, according to an embodiment of the present disclosure.

In operation S300, the device 100 may register an object. This is described in relation to operation S200 of FIG. 2.

In operation S310, the device 100 may acquire an image. This is described in relation to operation S210 of FIG. 2.

In operation S320, the device 100 may determine whether the object registered in the device 100 exists in the image. This is described in relation to operation S220 of FIG. 2.

In operation S330, the device 100 may display information about the registered object based on a detection cycle of the registered object if it is determined that the registered object does not exist.

According to an embodiment, the device 100 may store an image of the registered object. If it is determined that the registered object exists in the acquired image, the device 100 may store the image of the registered object in the form of an image or a moving picture. For example, if the device 100 determines that a wallet exists in the acquired image, the device 100 may store the image, in which the wallet exists, in the form of a picture or a moving picture.

Also, the device 100 may store a most recent image of the registered object. The image refers to an image that was most recently acquired by the device 100 from images determined as including the registered object. For example, if the device 100 acquires a first image in which the registered object exists and acquires a second image after 1 hour, in which the registered object exists, the device 100 may store the second image as the most recent image.

According to an embodiment, the device 100 may store a detection cycle of a registered object. The device 100 may acquire the detection cycle of the registered object based on a detection frequency of the registered object. For example, the device 100 may count the number of times a wallet registered in an image is detected over a preset time period and acquire an average cycle for which the wallet is detected from the image, based on the counted number of times and the preset time period.

According to an embodiment, if a registered object does not exist in an acquired image, the device 100 may display information about the registered object with reference to a detection cycle of the registered object. The information about the registered object refers to information which includes information reminding the user of the device 100 about the registered object. For example, if it is determined that the registered object does not exist in the acquired image, and a time when the registered object is not detected is longer than the detection cycle, the device 100 may display information about the registered object. In detail, if it is determined that a wallet registered in an image acquired by the device 100 does not exist, and a time when the registered wallet is not detected is longer than a detection cycle of the wallet, the device 100 may display information about the registered wallet.

According to an embodiment, the device 100 may display information about a registered object by using at least one selected from a voice, a message, and an image. For example, if it is determined that a registered wallet does not exist in an image acquired by the device 100, and a time when the registered wallet is not detected is longer than a detection cycle of the wallet, the device 100 may display information about the registered wallet by using a voice. The device 100 may also display the information about the wallet by using an image. The device 100 may use a picture or a moving picture and use a most recent image of a stored wallet.

FIG. 4 is a block diagram of the device 100 according to an embodiment of the present disclosure.

According to an embodiment, the device 100 may include a display unit 110, a storage unit 120, a controller 130, and an input unit 140.

According to an embodiment, the input unit 140 of the device 100 may acquire a scene around the user of the device 100 as an image. For example, the input unit 140 of the device 100 may acquire a scene existing in front of the user of the device 100 as an image. The image acquired by the input unit 140 of the device 100 may include a picture or a moving picture.

Also, the input unit 140 of the device 100 may acquire an image with reference to a position and a viewing angle of the user of the device 100. For example, the input unit 140 of the device 100 may acquire a scene around the position of the user of the device 100 as an image by using a camera module and acquire a scene the user of the device 100 may look at as an image in consideration of the user's position and the viewing angle.

According to an embodiment, the device 100 may store an acquired image in the storage unit 120 of the device 100. The storage unit 120 of the device 100 may store the acquired image in the form of a picture or a moving picture.

According to an embodiment, the controller 130 of the device 100 may detect an object existing in an acquired image. The controller 130 of the device 100 may detect the object from the image by using various types of algorithms. For example, the controller 130 of the device 100 may detect the object from the image by using an edge detection method but is not limited thereto.

According to an embodiment, the controller 130 of the device 100 may measure a detection frequency of an object. For example, the controller 130 of the device 100 may acquire an image at preset time intervals and count the number of images, in which the object exists, from among the acquired images to measure the detection frequency.

According to an embodiment, the controller 130 of the device 100 may measure an interaction frequency of an object. For example, the controller 130 of the device 100 may acquire an image at preset time intervals and count the number of times a detected object contacts a body of the user of the device 100 among the acquired images to measure the interaction frequency.

According to an embodiment, the controller 130 of the device 100 may measure a detection cycle of an object. For example, the controller 130 of the device 100 may count the number of times a wallet is detected from images over a preset time period and acquire a detection cycle of the wallet based on the counted number of times and the preset time period.

According to an embodiment, the controller 130 of the device 100 may set a threshold value to register an object in the device 100. The controller 130 of the device 100 may compare a detection frequency of the object with the threshold value to register the object in the device 100. For example, the controller 130 of the device 100 may set the threshold value to 10 times. If the threshold value is set to 10 times, the controller 130 of the device 100 may count the number of times a wallet is detected for a preset time and, if the counted number of times is 10 times or exceeds 10 times, register the object in the device 100.

Also, the controller 130 of the device 100 may compare an interaction frequency of the object with the threshold value to register the object in the device 100. For example, if the threshold value is set to 10 times, the controller 130 of the device 100 may count the number of times the user of the device 100 contacts a wallet for a preset time and, if the counted number of times is 10 times or exceeds 10 times, the controller 130 of the device 100 may register the wallet in the device 100.

Also, the controller 130 of the device 100 may compare the interaction frequency and a detection frequency of the object with the threshold value to register the object in the device 100. For example, if the threshold value is set to 10 times, and a sum of the number of detections of the wallet counted for a preset time and the number of times the user of the device 100 contacts the wallet counted over a preset time period is 10 times or exceeds 10 times, the controller 130 of the device 100 may register the object in the device 100.

The controller 130 of the device 100 may compare a detection cycle of the object with the threshold value to register the object in the device 100. For example, if the threshold value is set to 4 hours, and an average detection cycle of the wallet, which is calculated based on the number of the detections of the wallet counted over the preset time period and the preset time period, is within 4 hours, the controller 130 of the device 100 may register the wallet in the device 100.

According to an embodiment, the controller 130 of the device 100 may determine a preset time period and a threshold value based on an input of the user. For example, the controller 130 of the device 100 may register an object, which is detected 5 times over a period of 5 hours, in the device 100 based on an input of the user.

According to an embodiment, the controller 130 of the device 100 may allocate an ID to an object when registering the object. The controller 130 of the device 100 may store at least one selected from characteristic information and representative image information of the object in a form of a mapping table in the storage unit 120 of the device 100. For example, the controller 130 of the device 100 may allocate an ID to a wallet when registering the wallet and store the allocated ID, characteristic information, and representative image information of the wallet in the form of a mapping table in the storage unit 120 of the device 100.

According to an embodiment, the controller 130 of the device 100 may determine whether a registered object exists in an image. The controller 130 of the device 100 may compare characteristic information of the object detected from the acquired image with stored characteristic information of a registered object to determine whether the registered object exists in the image. For example, the controller 130 of the device 100 may compare effective edge information of the object detected from the acquired image with effective edge information of a registered wallet stored in the storage unit 120 of the device 100 to determine whether the object detected from the acquire image is the registered wallet.

According to an embodiment, the storage unit 120 of the device 100 may store associated information of a registered object. For example, the storage unit 120 of the device 100 may include information about at least one object associated with the registered object as associated information. The at least one object associated with the registered object may include an object that is frequently detected at a similar time to a time when the registered object is detected.

In detail, if a TV is registered in the device 100, the controller 130 of the device 100 may store information about at least one selected from a remote controller frequently detected at a similar time to a time when the TV is detected, a speaker operating along with the TV, and a smartphone operating along with the TV, as associated information of the registered TV in the storage unit 120 of the device 100. In this case, the information stored in the storage unit 120 of the device 100 may include a most recent image. For example, the storage unit 120 of the device 100 may store an image that was most recently acquired from images determined as including the remote controller, the speaker operating along with the TV, the smartphone operating along with the TV, etc.

If a registered object indicates a place, the storage unit 120 of the device 100 may store information about an object associated with the registered object indicating the place as associated information. For example, if the controller 130 of the device 100 registers a front door indicating an entrance to a home, the storage unit 120 of the device 100 may store information about an object, such as a wallet, a portable phone, or the like, which is frequently detected for a preset time before the registered front door is detected, as associated information about the registered front door.

The storage unit 120 of the device 100 may also store information based on an input of the user as associated information. For example, if the user of the device 100 inputs a regular checkup date of a car registered in the device 100 into the device 100, the storage unit 120 of the device 100 may store information about the regular checkup date of the car as associated information of the registered car.

According to an embodiment, if it is determined that a registered object exists in an image acquired by the input unit 140 of the device 100, the display unit 110 of the device 100 may display stored associated information of the registered object. For example, the display unit 110 of the device 100 may display information about an object that is frequently detected at a similar time to a time when the registered object is detected. In detail, if it is determined that a registered TV exists in an image acquired by the input unit 140 of the device 100, the display unit 110 of the device 100 may display information about at least one selected from a remote controller, a speaker operating along with the TV, and a smartphone operating along with the TV but is not limited thereto.

Also, if the controller 130 of the device 100 determines that a registered object exists in an image acquired by the input unit 140 of the device 100, the display unit 110 of the device 100 may display information based on an input of the user. In detail, if the controller 130 of the device 100 determines that a registered car exists in an image acquired by the input unit 140 of the device 100, the display unit 110 of the device 100 may display information about a regular checkup date of the car input by the user but is not limited thereto.

Also, if the controller 130 of the device 100 determines that a registered object indicating a place exists in an image acquired by the input unit 140 of the device 100, the display unit 110 of the device 100 may display information about an object associated with the registered object indicating the place. For example, if the controller 130 of the device 100 determines a registered front door indicating an entrance to a home, the display unit 110 of the device 100 may display information about an object, such as a wallet, a portable phone, or the like, which is frequently detected for a preset time before the registered front door is detected, as associated information of the registered front door.

When displaying the information about the object associated with the registered object indicating the place, the controller 130 of the device 100 may refer to a time interval between a detection time of the object associated with the registered object and a detection time of the registered object. For example, if the controller 130 of the device 100 detects a registered front door, the controller 130 of the device 100 may display information about a portable phone if a time interval between a detection time of the registered front door and a detection time of the portable phone associated with the registered front door is equal to or higher than a preset value, with reference to the time interval. In this case, the preset value may include an average time interval of the registered front door and the portable phone.

According to an embodiment, the display unit 110 of the device 100 may display associated information by using at least one selected from a voice, a message, and an image. For example, if the controller 130 of the device 100 detects a registered front door indicating an entrance to a home, the display unit 110 of the device 100 may display information about an object, such as a wallet, a portable phone, or the like, which is frequently detected for a preset time before the registered front door is detected, by using a voice. The display unit 110 of the device 100 may also display the information about the object, such as the wallet, the portable phone, or the like, by using a message. Also, the display unit 110 of the device 100 may display the information about the object, such as the wallet, the portable phone, or the like, by using an image. The display unit 110 of the device 100 may use a picture or a moving picture and use a most recent image of a stored object.

According to an embodiment, if a registered object does not exist in an acquired image, the controller 130 of the device 100 may display information about the registered object on the display unit 110 of the device 100 with reference to a detection cycle of the registered object. For example, if the controller 130 of the device 100 determines that a registered object does not exist in an image acquired by the input unit 140 of the device 100, and a time when the registered object is not detected is longer than a detection cycle, the display unit 110 of the device 100 may display information about the registered object. In detail, if it is determined that a registered wallet does not exist in an image acquired by the input unit 140 of the device 100, and a time when the registered wallet is not detected is longer than a detection cycle of the wallet, the controller 130 of the device 100 may display information about the registered wallet on the display unit 110 of the device 100.

According to an embodiment, the display unit 110 of the device 100 may display information about a registered object by using at least one selected from a voice, a message, and an image. For example, if the controller 130 of the device 100 determines that a registered wallet does not exist in an image acquired by the input unit 140 of the device 100, the display unit 110 of the device 100 may display information about the registered wallet by using a voice. The display unit 110 of the device 100 may also display the information about the wallet by using an image. The display unit 110 of the device 100 may use a picture or a moving picture and use a most recent image of a stored wallet.

Figure 5A:
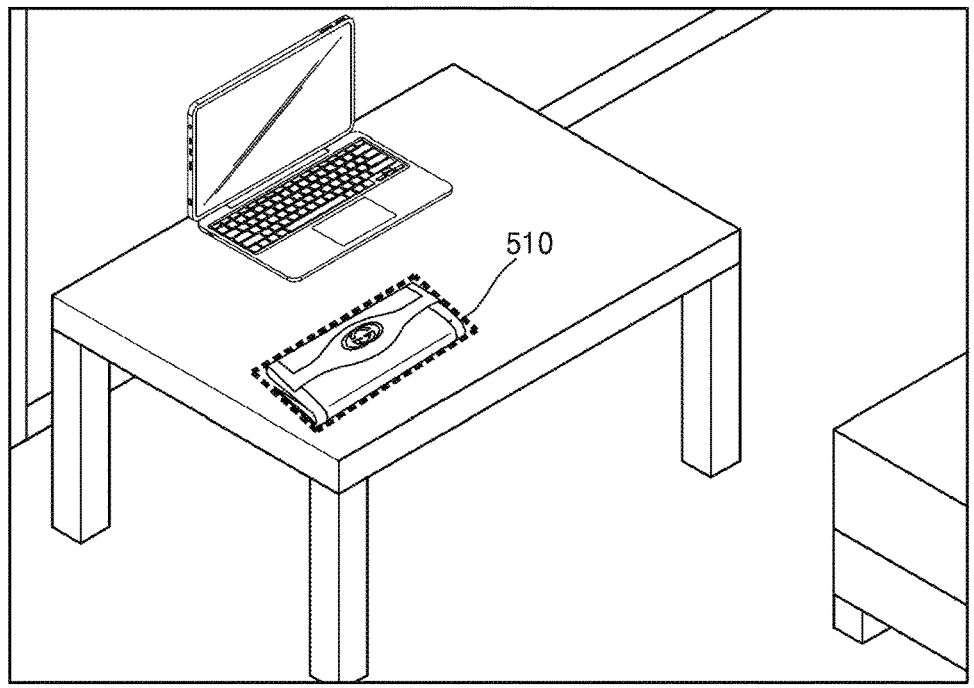
FIGS. 5A and 5B illustrate a process of detecting an object from an image through a device according to an embodiment of the present disclosure.
Figure 5B:
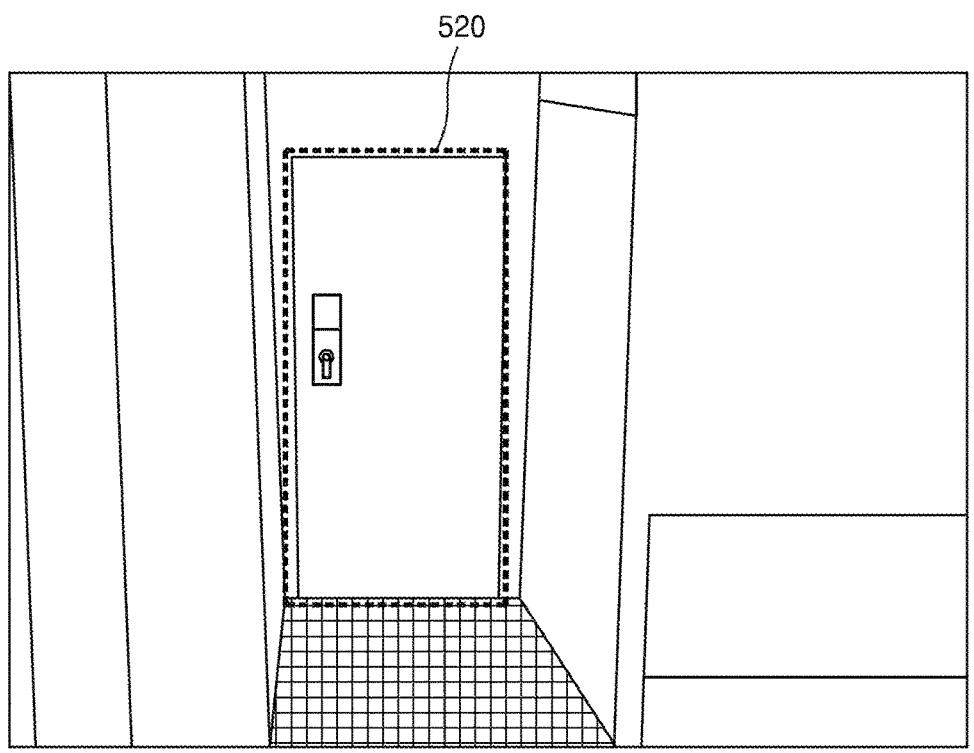

FIGS. 5A and 5B illustrate a process of detecting an object from an image through the device 100 according to an embodiment of the present disclosure.

Referring to FIG. 5A, the device 100 may detect an object existing in an acquired image. For example, the object may include a wallet 510.

Referring to FIG. 5B, the device 100 may detect an object indicating a place from an acquired image. For example, the device 100 may detect a front door 520 indicating a front door of a home.

FIG. 6 illustrates a process of reminding a user about a registered object based on a detection frequency of the registered object through the device 100, according to an embodiment of the present disclosure.

According to an embodiment, if a registered object does not exist in an acquired image, the device 100 may display information about the registered object on the display unit 110 of the device 100 with reference to a detection cycle of the registered object. For example, if it is determined that a registered cellular phone does not exist in an acquired image, and a time when the registered cellular phone is not detected is longer than a detection cycle of a wallet, the device 100 may display information about the registered cellular phone.

According to an embodiment, the device 100 may display information about a registered object on the display unit 110 of the device 100 by using a message 610. The device 100 may also display the information about the registered object on the display unit 110 of the device 100 by using the message 610 and an image 620. In this case, an image may include a most recent image of the registered object.

Figure 7:
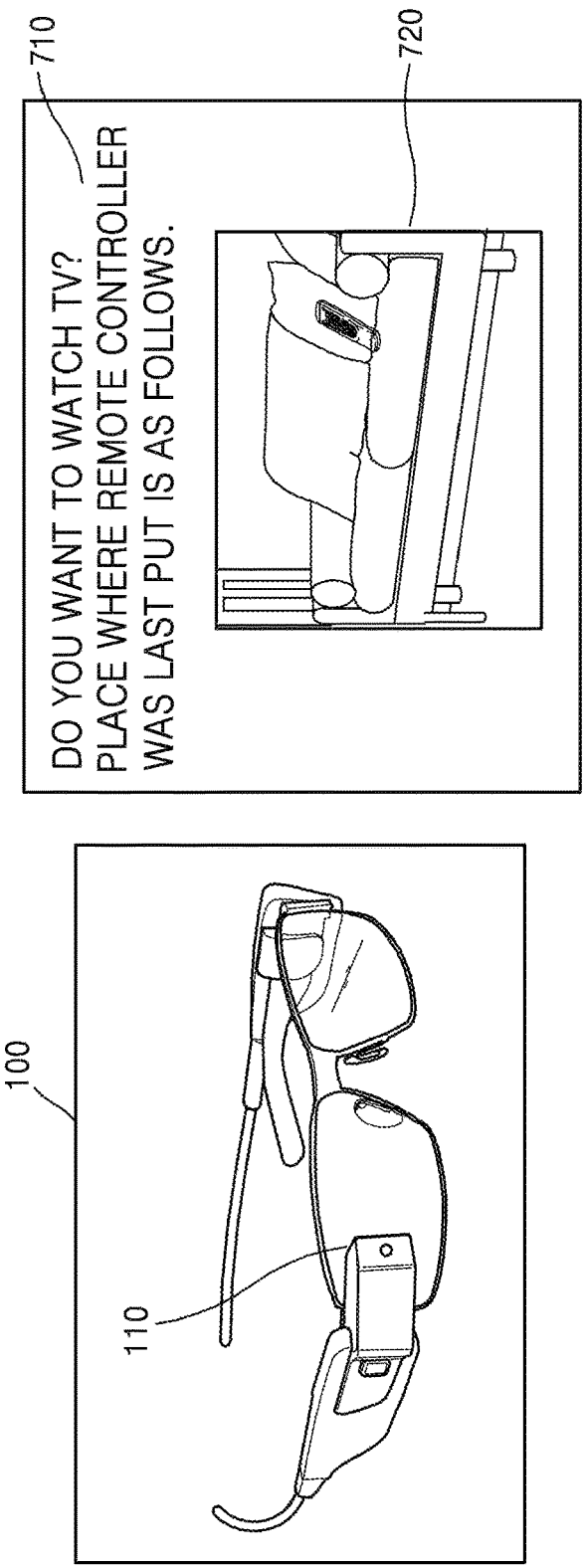
FIG. 7 illustrates a process of displaying information about an object associated with a registered object if a device detects the registered object, according to an embodiment of the present disclosure.

FIG. 7 illustrates a process of displaying information about an object associated with a registered object if the device 100 detects the registered object, according to an embodiment of the present disclosure.

According to an embodiment, if it is determined that a registered object exists in an image acquired by the device 100, the device 100 may display information about an object that is frequently detected at a similar time to a detection time of the registered object. In detail, if it is determined that a registered TV exists in an image acquired by the device 100, the device 100 may display information about a remote controller that is frequently detected at a similar time to a detection time of the TV.

According to an embodiment, the device 100 may display information about an object, which is frequently detected at a similar time to a detection time of a registered object, on the display unit 110 of the device 100 by using a message 710. Alternatively, the device 100 may display the information about the object on the display unit 110 of the device 100 by using the message 710 and an image 720. In this case, an image may include a most recent image of an object that is frequently detected at a similar time to a detection time of a registered object.

FIG. 8 illustrates a process of displaying information based on an input of a user if the device 100 detects a registered object, according to an embodiment of the present disclosure.

According to an embodiment, if it is determined that a registered object exists in an acquired image, the device 100 may display information about an input previously input by the user. For example, if the device 100 determines that a registered car exists in an acquired image, the device 100 may display information about a regular checkup date of the car input by the user. Also, if the device 100 determines that the registered car exists in the acquired image, the device 100 may display information about a $10^{th}$-day-no-driving input by the user.

According to an embodiment, the device 100 may display information based on an input of the user on the display unit 110 of the device 100 by using a message 810. Alternatively, the device 100 may display the information based on the input of the user on the display unit 110 of the device 100 by using the message 810 and an image 820. In this case, an image may include representative image information of a stored registered object.

Figure 9A:
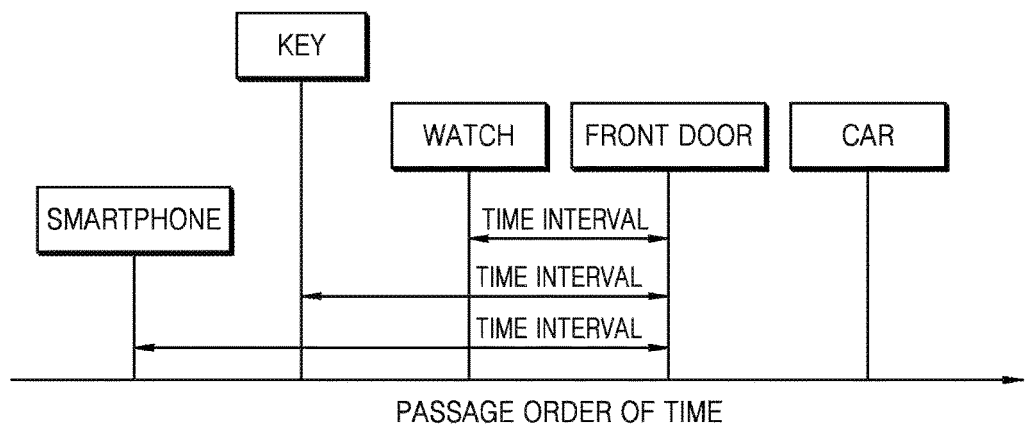
FIGS. 9A and 9B illustrate a method of displaying information about an object associated with a registered object indicating a place if a device detects the registered object indicating the place, according to an embodiment of the present disclosure.
Figure 9B:
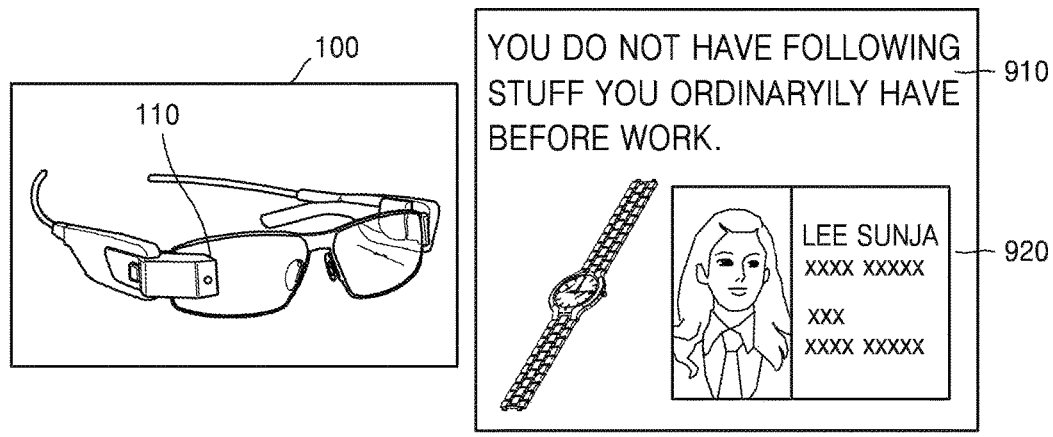

FIGS. 9A and 9B illustrate a method of displaying information about an object associated with a registered object indicating a place if the device 100 detects the registered object indicating the place, according to an embodiment of the present disclosure.

According to an embodiment, if it is determined that a registered object indicating a place exists in an acquired image, the device 100 may display information about an object associated with the registered object indicating the place. For example, if the device 100 detects a registered front door indicating an entrance to a home, the device 100 may display information about an object, such as a smartphone, a key, a watch, or the like, which is frequently detected for a preset time before the registered front door is detected, as associated information about the registered front door.

Referring to FIG. 9A, when displaying information about an object associated with a registered object indicating a place, the device 100 may refer to a time interval between a detection time of the object associated with the registered object and a detection time of the registered object. For example, if the device 100 detects a registered front door, and a time interval between a detection time of the registered front door and a detection time of a smartphone associated with the registered front door is equal to or higher than a preset value, the device 100 may display information about the smartphone with reference to the time interval. In this case, the preset time may include an average time interval between the detection time of the registered front door and the detection time of the smartphone.

Referring to FIG. 9B, the device 100 may display information about an object associated with a registered object on the device 100 by using a message 910. Alternatively, the device 100 may display the information about the object on the device 100 by using the message 910 and an image 920. In this case, an image may include a most recent image of an object associated with a stored registered object. The image may also include representative image information of the object associated with the stored registered object.

Figure 10:
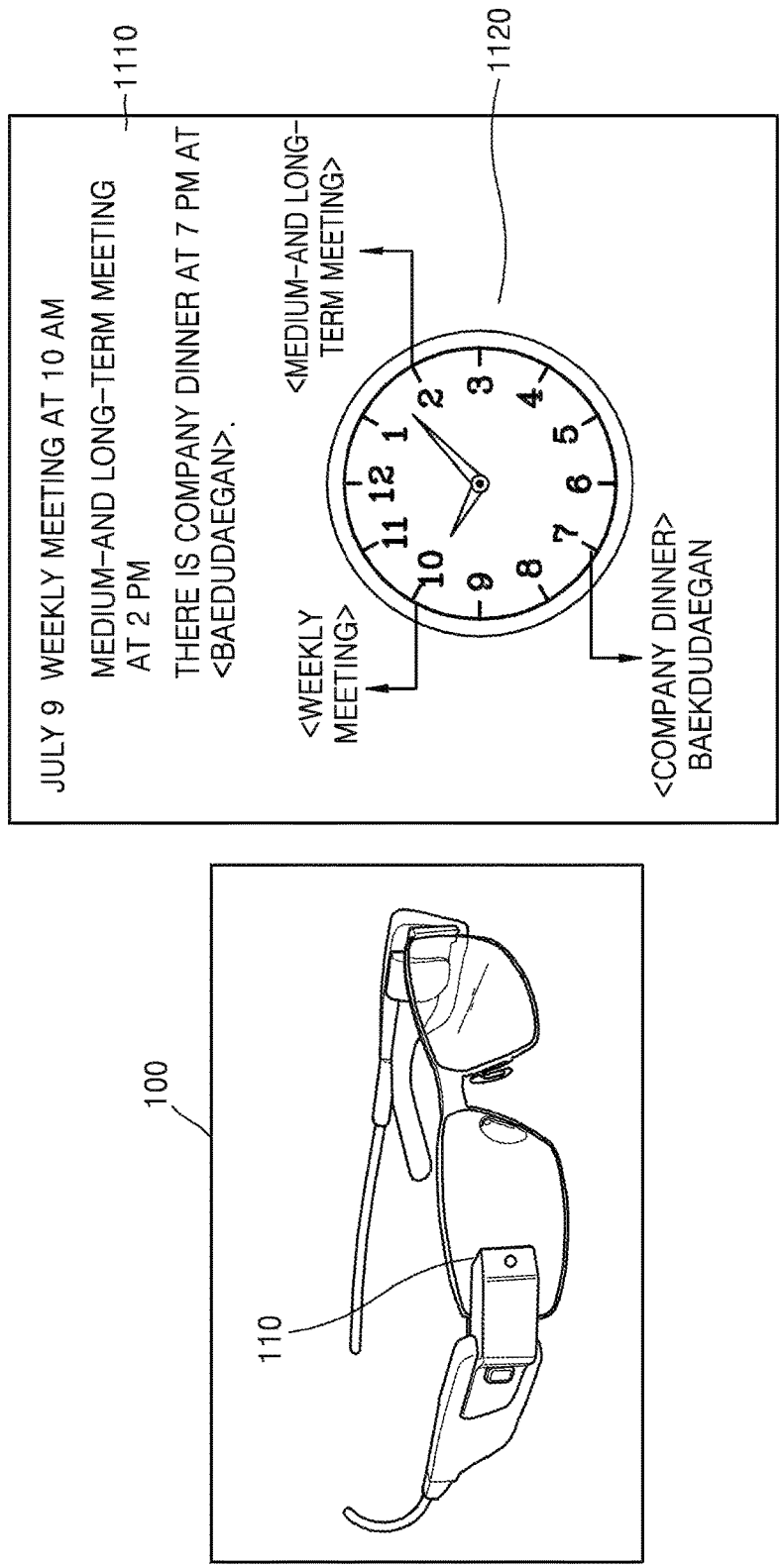
FIG. 10 illustrates a process of displaying information based on an input of a user if a device detects a registered object indicating a place, according to an embodiment of the present disclosure.

FIG. 10 illustrates a process of displaying information based on an input previously input by the user if the device 100 detects a registered object indicating a place, according to an embodiment of the present disclosure.

According to an embodiment, if it is determined that a registered object indicating a place exists in an acquired image, the device 100 may display information based on an input previously input by the user. For example, if the device 100 detects a registered office door indicating an entrance to an office, the device 100 may display a schedule previously input by the user as associated information about the registered office door.

According to an embodiment, the device 100 may display information based on information, which was input with respect to a registered object indicating a place by the user, on the display unit 110 of the device 100 by using a message 1010. Alternatively, the device 100 may display the information on the display unit 110 of the device 100 by using the message 1110 and an image 1120. In this case, an image may include an image associated with stored information previously input by the user.

Figure 11:
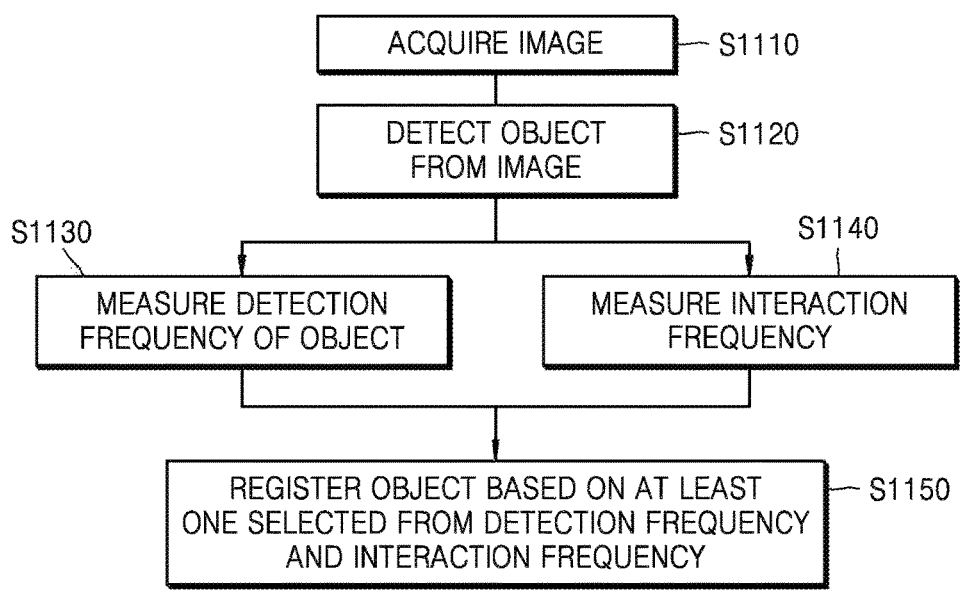
FIG. 11 is a flowchart of a method of registering an object in a device, according to an embodiment of the present disclosure.

FIG. 11 is a flowchart of a method of registering an object in the device 100, according to an embodiment of the present disclosure.

In operation S1110, the device 100 may acquire an image. This is described in relation to operation S210 of FIG. 2.

In operation S1120, the device 100 may detect an object from the image.

According to an embodiment, the device 100 may detect an object from an image by using various types of algorithms. For example, the device 100 may detect the object from the image by using an edge detection method but is not limited thereto.

In operation S1130, the device 100 may measure a detection frequency of the object.

According to an embodiment, the device 100 may measure a detection frequency of an object. The detection frequency is defined as the number of times an object appears in acquired images. For example, the device 100 may acquire images at preset time intervals and count the number of images, in which objects exist, from among the acquired images to measure a detection frequency.

In operation S1140, the device 100 may measure an interaction frequency of the object.

According to an embodiment, the device 100 may measure an interaction frequency of an object. The interaction frequency is defined as the number of times an object contacting the user of the device 100 appears in acquired images over a preset time period. For example, the device 100 may acquire images at preset time intervals and count the number of times a detected object contacts the body of the user of the device 100 among the acquired images to measure an interaction frequency.

In operation S1150, the device 100 may registered the object based on at least one selected from the detection frequency and the interaction frequency.

According to an embodiment, the device 100 may set a threshold value for registering an object in the device 100. The device 100 may also use the threshold value as a criterion for determining whether to register the object.

According to an embodiment, the device 100 may compare a detection frequency of the object with the threshold value to register the object in the device 100. For example, the device 100 may set the threshold value to 10 times. If the threshold value is set to 10 times, the device 100 may count the number of times a wallet is detected over a preset time period and, if the counted number of times is set to 10 times or exceeds 10 times, register the object in the device 100.

The device 100 may also compare an interaction frequency of the object with the threshold value to register the object in the device 100. For example, if the threshold value is set to 10 times, the device 100 may count the number of times a wallet contacts the user of the device 100 over a preset time period and, if the counted number of times is 10 times or exceeds 10 times, register the wallet in the device 100.

Also, the device 100 may compare the interaction frequency and the detection frequency of the object with the threshold value to register the object in the device 100. For example, if the threshold value is set to 10 times, and a sum of the number of detections of the wallet counted over a preset time period and the number of contacts of the wallet with the user of the device 100 over a preset time period is 10 times or exceeds 10 times, the device 100 may register the object in the device 100.

The device 100 may also compare a detection cycle of the object with the threshold value to register the object in the device 100. For example, if the threshold value is set to 4 hours, and an average detection cycle of the wall, which is calculated based on the number of detections of the wallet counted over the preset time period and the preset time period, is within 4 hours, the device 100 may register the wallet in the device 100.

According to an embodiment, the device 100 may determine a preset time period and a threshold value based on an input previously input by the user. For example, the device 100 may register an object, which is detected 5 times over 5 hours, in the device 100 based on the input of the user.

According to an embodiment, the device 100 may allocate an ID to an object when registering the object. The device 100 may also store at least one selected from characteristic information and representative image information of the object in a form of a mapping table. For example, the device 100 may allocate an ID to a wallet when registering the wallet and store the allocated ID, characteristic information, and representative image information of the wallet in a form of a mapping table.

Some of the various embodiments may be embodied on a non-transitory computer-readable recording medium including a computer-executable program module and a computer-executable command for execution by at least one processor. A non-transitory computer-readable recording medium may be an arbitrarily available medium that may be accessed by a computer and may include all of a volatile medium, a nonvolatile medium, a separable type medium, and a non-separable type medium. The non-transitory computer-readable recording medium may also include all of a computer storage medium and a communication medium. The non-transitory computer-readable recording medium may include all of a volatile medium, a nonvolatile medium, a separable medium, and a non-separable medium that are embodied through an arbitrary method or technology for storing information such as a computer-readable command, a data structure, a program module, or other pieces of data. The communication medium includes a computer-readable command, a data structure, a program module, other pieces of data of a modulated data signal such as or the like, or other transmission mechanisms and arbitrary information transmission media.

It should be understood that various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operating method of a device, the method comprising:
    acquiring an image comprising a scene around a user of the device;
    determining whether a pre-registered object exists in the acquired image, the object being pre-registered in the device by detecting from another image acquired by the device based on a preset criterion;
    in response to determining that the pre-registered object does not exist in the acquired image, comparing a detection frequency which the object is detected and an elapsed time from when the object was last detected; and
    if the pre-registered object does not exist in the acquired image and the elapsed time from when the object was last detected is longer than the detection frequency which the object is detected, displaying an information reminding the user of the device about the pre-registered object,
    wherein the detection frequency is an average time until the object detected from the acquired image is re-detected.

2. The method of claim 1, wherein the object is registered based on at least one selected from a detection frequency indicating a number of times the object appears in the image acquired by the device and an interaction frequency indicating a number of times the object contacts the user of the device in the acquired image.

3. The method of claim 1, further comprising:
    displaying associated information of the registered object, upon determining that the registered object exists in the image.

4. The method of claim 1, wherein the information about the registered object comprises a most recent image from which the registered object is detected.

5. The method of claim 3, wherein the associated information comprises information about at least one object associated with the registered object.

6. The method of claim 4, wherein the information about the at least one object comprises a most recent image from which the at least one object is detected.

7. The method of claim 3, wherein the associated information comprises information that is input for the registered object by the user.

8. The method of claim 3, wherein the registered object indicates a place, and the associated information comprises information about at least one object associated with the registered object.

9. The method of claim 8, wherein the displaying of the associated information comprises displaying information about at least one object associated with the registered object with reference to a time interval between a detection time of the registered object and a detection time of the at least one object associated with the registered object.

10. The method of claim 8, wherein the associated information comprises a most recent image from which at least one object associated with the registered object is detected.

11. The method of claim 3, wherein the registered object indicates a place, and the associated information comprises information that is input for the registered object by the user.

12. A non-transitory computer-readable recording medium having recorded thereon a program for executing by at least one processor the method of claim 1.

13. A device comprising:
    a display;
    a camera; and
    a controller configured to:
        acquire an image comprising a scene around a user of the device by the camera,
        determine whether a pre-registered object exists in the acquired image, the object being pre-registered in the device by detecting from another image acquired by the device based on a preset criterion,
        in response to determining that the pre-registered object does not exist in the acquired image, compare a detection frequency which the object is detected and an elapsed time from when the object was last detected, and
        if the pre-registered object does not exist in the acquired image and the elapsed time from when the object was last detected is longer than the detection frequency which the object is detected, display an information reminding the user of the device about the pre-registered object,
    wherein the detection frequency is an average time until the object detected from the acquired image is re-detected.

14. The device of claim 13, wherein the object is registered based on at least one selected from a detection frequency indicating a number of times the object appears in the image acquired by the device and an interaction frequency indicating a number of times the object contacts the user of the device in the acquired image.

15. The device of claim 13, wherein the controller is further configured to control to display associated information of the registered object, upon determining that the registered object exists in the image, and
    wherein the display unit is further configured to display the associated information.

16. The device of claim 13, wherein the information about the registered object comprises a most recent image from which the registered object is detected.

17. The device of claim 15, wherein the associated information comprises information about at least one object associated with the registered object.

18. The device of claim 16, wherein the information about the at least one object comprises a most recent image from which the at least one object is detected.

19. The device of claim 15, wherein the associated information comprises information that is input for the registered object by the user.

20. The device of claim 15, wherein the registered object indicates a place, and the associated information comprises information about at least one object associated with the registered object.

21. The device of claim 20, wherein the controller is further configured to control to display information about at least one object associated with the registered object, with reference to a time interval between a detection time of the registered object and a detection time of at least one object associated with the registered object.

22. The device of claim 20, wherein the associated information comprises a most recent image from which at least one object associated with the registered object is detected.

23. The device of claim 15, wherein the registered object indicates a place, and the associated information comprises information about the registered object based on an input of the user.

\* \* \* \* \*